United States Patent

[11] 3,616,115

| [72] | Inventor | Norman Klimmek |
| | | Palos Verdes Estates, Calif. |
| [21] | Appl. No. | 762,044 |
| [22] | Filed | Sept. 24, 1968 |
| [45] | Patented | Oct. 26, 1971 |
| [73] | Assignee | North American Rockwell Corporation |

[54] LIGHTWEIGHT BALLISTIC ARMOR
5 Claims, 3 Drawing Figs.

[52] U.S. Cl. .................................................. 161/39, 29/484, 89/36, 109/84, 161/43, 161/404
[51] Int. Cl. .................................................. F41h 5/04
[50] Field of Search ......................................... 161/39, 404, 43; 89/36; 109/80, 82, 84; 29/484

[56] References Cited
UNITED STATES PATENTS

| 952,877 | 3/1910 | Cowper-Coles | 89/36 X |
| 1,215,727 | 2/1917 | Slattery | 109/84 |
| 1,423,652 | 7/1922 | Edmondson | 89/36 X |
| 1,444,610 | 2/1923 | Hutchins et al. | 89/36 X |
| 2,410,022 | 10/1946 | Dumais | 89/36 X |
| 3,324,768 | 6/1967 | Eichelberger | 89/36 |
| 3,431,818 | 3/1969 | King | 89/36 |

FOREIGN PATENTS

| 9,830 | 7/1901 | Great Britain | 89/36 |

Primary Examiner—John T. Goolkasian
Assistant Examiner—Joseph C. Gil
Attorneys—William R. Lane, Charles F. Dischler and Harold H. Card, Jr.

ABSTRACT: A lightweight composite armor plate is disclosed wherein successive layers of small discrete ceramic blocks are encapsulated within a metallic matrix by solid-state diffusion bonding. Residual stress effects from the bonding step prestress the blocks in compression, whereby a greater amount of energy from an impacting projectile is required to shatter the ceramic.

PATENTED OCT 26 1971

3,616,115

INVENTOR.
NORMAN KLIMMEK
BY
ATTORNEY

LIGHTWEIGHT BALLISTIC ARMOR

BACKGROUND OF INVENTION

Armor protection in tanks and other military ground vehicles typically comprises either solid or laminated plates of hard metals and alloys capable of deflecting or fragmenting bullets and other projectiles commonly used in modern combat. Armor plate materials thus known to the prior art are extremely heavy and impose a high-performance penalty when used in aircraft, with the result that armor protection is commonly provided only for cockpit seats and, in rare instances, around small vital components. Accordingly, a need exists for structural panels capable of providing ballistic armor protection and characterized by reasonable lightweight to adapt the same for use in aircraft or other applications wherein bulk or mass are of critical overriding importance.

SUMMARY OF INVENTION

Referring to FIG. 3 in the accompanying drawing, it may be seen that the inventive structure in this case illustratively comprises a plurality of ceramic blocks 30 and 32 arranged in separate layers and encapsulated within a surrounding matrix of metal or alloy such as the titanium alloy commercially known as 6 AL—4 V. The ceramic and metallic components are joined together to form the structure of FIG. 3 by assembling the individual blocks and sheets or strips of metal in their desired final relationship within a retort 40 to which heat and pressure are applied in a coordinated time-pressure-temperature relationship as required to cause solid state diffusion bonding of the metallic workpiece components to each other. The stated components include relatively massive frames 18 and 20 in addition to the partitions which separate and contain blocks 30 and 32. Residual stress effects in the metallic components resulting from the bonding operation hold the blocks under continuous compressive force and thus prestress the blocks. The panel 10 thus formed may illustratively be joined to one or more layers of backing material such as laminated fiber sheets 58 and mounted in airplanes, missiles or various military vehicles to provide ballistic protection against impacting projectiles and the like.

DETAILED DESCRIPTION

Figure 1:
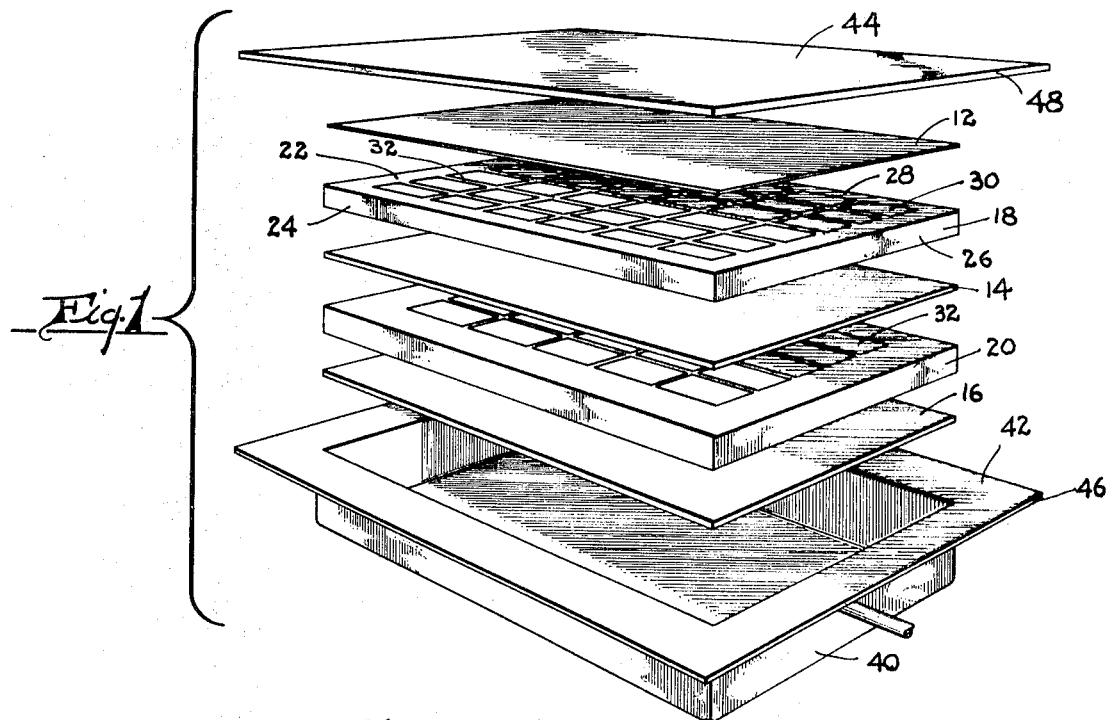
FIG. 1 shows a general perspective and exploded view of workpiece and tooling elements illustratively usable to fabricate the inventive structure.

Referring to FIG. 1, the lightweight armor plate or panel disclosed herein may illustratively be made by initially assembling the component parts thereof in desired final relationship within a container to form a so-called workpack. The metallic workpiece components include a face sheet 12, an intermediate sheet 14 and a lower sheet 16. Each of the sheets is essentially of rectangular shape and substantially uniform thickness, but not necessarily the same thickness in each case. Thus, sheet 12 is preferably thinner than sheet 14 which is preferably thinner than sheet 16.

Between sheets 14 and each of the remaining sheets 12 and 16, a flat frame is situated as suggested by frames 18 and 20. Each of the frames is of rectangular shape and defines a peripheral area substantially coinciding with the shape and size of sheets 12, 14, and 16. Each frame includes a plurality of relatively massive peripheral members adapted to join each other at the ends thereof to form the corners of each frame as suggested by portions 22, 24, 26, and 28 of frame 18. The frames 18 and 20 enclose a plurality of ceramic blocks 30 and 32, respectively, laid in rows and with partitions separating each of the blocks from the others, as suggested by partitions 34 and 36. Partitions 34 and 36 may be integrally formed with the peripheral members forming frames 18 and 20, or alternatively may be separate strips or ribs preplaced between the bricks in the relationship shown by FIGS. 1 and 2, for example, and thereafter joined to the frame during the diffusion bonding step disclosed hereinbelow.

Figure 2:
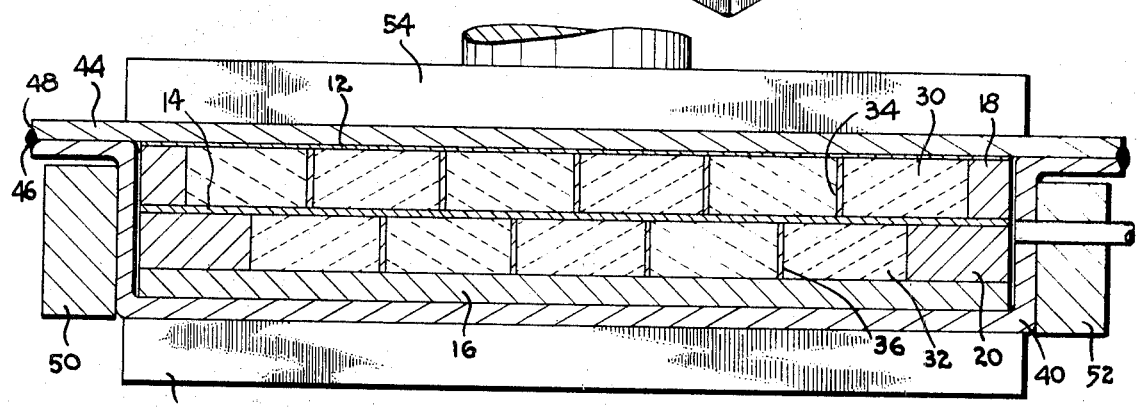
FIG. 2 shows a cross-sectional view of the structure of FIG. 1 assembled as necessary to perform the diffusion bonding step.

As shown particularly by FIG. 2, the contents of lower frame 20 with regard to arrangements of blocks 32 is preferably such that partitions 36 separating the blocks are not aligned directly beneath partitions 34 between blocks 30, whereby blocks 30 and 32 are staggered in the familiar manner of chimney bricks when viewed in cross section.

The mentioned components are assembled in the relationship described above and suggested in the drawings within a container or retort 40 having a peripheral flange 42 formed thereon. A lid or cover member 44 is placed over retort 40 and secured thereto by suitable means such as welding across the distal edges 46 and 48 of flange 42 and lid 44, respectively. Thereafter, retort 40 together with its contents may be heated by appropriate means such as in a furnace for a sufficient time to elevate the contents of the retort to a suitable temperature for diffusion bonding of the same. While in the heated condition, the retort may be placed within heated platens 54 and 56 of a conventional press and surrounded by heavy steel restraining frame means such as suggested by members 50 and 52 in FIG. 2, whereby high-compressive force exerted by the platens vertically through the workpack is prevented from deforming the same laterally. Compressive force is then applied to the workpack for the required period of time, which will depend upon the temperature and workpiece materials involved. At the completion of diffusion bonding between partition members and frame elements as well as sheets 12, 14, and 16 whereby a single unitary workpiece mass results, the workpack is removed from the mentioned press, and retort 40 is opened by removal of lid portion 44 so that the finished panel 10 may be removed. Thereafter, workpiece panel 10 may be bonded by suitable means such as adhesive to one or more backing sheets such as resin-reenforced fiber laminates 58 as suggested in FIG. 3 prior to installation of the same in a vehicle or other location requiring ballistic protection.

It will be understood that the inventive concept in this case may be practiced with a wide variation of metals and alloys, and that the parameters for achieving solid-state diffusion bonding will necessarily vary for each particular choice of workpiece material. Among the metals or alloys which may be joined by solid-state diffusion bonding are aluminum, stainless steel, titanium, nickel, tantalum, molybdenum, zirconium and columbium, although not all of these materials are appropriate in the context of this case. Diffusion bonding is characterized by intermolecular exchange between contacting surfaces of the workpiece at suitable pressures and at temperatures below the melting point of the workpiece material. In some cases, a thin interleaf material, or eutectic former, is provided while in other forms of solid-state bonding no interleaf material is required. The prior art involving solid-state or intermolecular diffusion bonding includes issued U.S. Pat. Nos. 3,145,466; 3,180,022; 3,044,160; 2,850,798; and 3,170,234. The precise values of time-temperature and pressure utilized in connection with bonding workpiece materials is not a critical or limiting feature of the broad concept disclosed herein, but specific materials with which the concept is usable are stated for illustration only. Thus, for example, if workpiece elements 12, 14, 16, 18, 20, 34, and 36 are titanium, solid-state bonding thereof may be achieved under coordinated time-temperature-pressure conditions of from about 2 to 10 hours, from about 1,500° F. to 1,900° F. and from about 250—5,000 p.s.i. compressive force. Where large workpiece areas are sought to be diffusion-bonded, total forces on the order of 500 tons would be required. Similarly, many different metals or alloys for the tooling elements such as items 40 and 44 could be used to practice the inventive principles taught herein, although it is preferable that the tooling materials not be capable of bonding to the workpiece elements. Thus, if titanium is used in the metallic workpiece components, then retort 40 and lid 44 are preferably mild steel. Similarly, a variety of different materials for ceramic blocks 30 and 32 may be used in practicing the concept disclosed herein. The ceramic materials best suited for use in blocks 30 and 32 are those having relatively lightweight combined with maximum hardness and high density. Illustratively, boron carbide has been used successfully in practicing the inventive concept. Other refractory materials, especially silicides and oxides such as alumina, zirconia, beryllia, titania or the like, are usable in blocks 30 and 32. In addition, less costly materials such as fired clays, stone, concrete or earthenware materials are useful instead of the mentioned refractory materials where weight considerations are not critical, as in tanks, trucks or other military vehicles.

However, in each case, it will be understood that the metallic elements of the finished panel encapsulate the blocks or masses 30 and 32, and apply continuous compressive force substantially toward the geometric center of each such mass. Moreover, relatively massive frames 18 and 20 have sufficient rigidity and strength to resist outward deflection, thus apply compressive force laterally through each mass 30 and 32, respectively, and through the individual layers contained within each of the frames. It is this lateral force which results in most of the prestressing of the ceramic masses to increase the resistance of the finished panel to ballistic impact.

Figure 3:
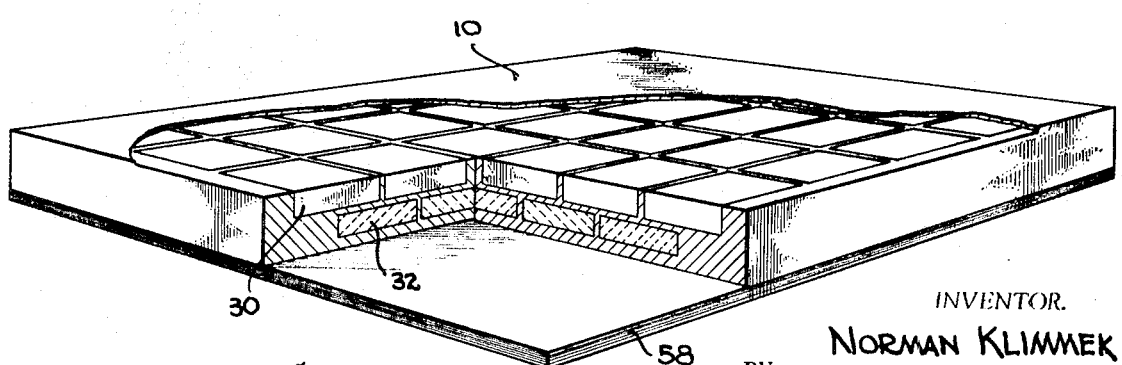
FIG. 3 is a general perspective view, partially cut away, showing a finished panel fabricated in accordance with the inventive principles disclosed herein.

It is, additionally, a feature of the structure shown in FIGS. 2 and 3, for example, that sheet 12 which forms the outermost portion of the finished panel and therefore is the first element impacted by a projectile, is relatively thin. Thus, an impacting projectile will penetrate sheet 12 with relative ease, but will not be directionally focused or stabilized by material in sheet 12. Instead, most of the energy of impact will be dissipated by fragmentation of masses 30 and 32, which resist such fragmentation with greater effect due to prestressing of the same and by lateral restraint applied to the masses by frames 18 and 20.

I claim:
1. A diffusion-bonded structure for ballistic armor protection and the like, comprising:
   a plurality of discrete ceramic blocks, and
   a diffusion-bonded metallic matrix encapsulating said blocks and applying continuous residual compressive force thereto as a result of such diffusion bonding thereby prestressing said blocks.
2. The structure set forth in claim 1 above, wherein:
   said blocks are arranged in a plurality of layers each containing a plurality of blocks, said blocks in each of said layers being staggered relative to the other of said layers in the manner of chimney bricks.
3. The structure set forth in claim 2 above, wherein:
   said metallic matrix includes at least one relatively massive frame around the periphery of said layers.
4. In a diffusion-bonded panel for ballistic armor protection:
   at least one mass of refractory material arranged to present a surface area portion for impact of a projectile against said area portion, and
   metallic constraining means comprising discrete portions joined by diffusion-bonding surrounding said mass and applying continuous compressive force thereon substantially toward the geometric center of said mass as a result of such diffusion bonding in an amount sufficient to prestress said mass throughout.
5. The structure set forth in claim 4 above, wherein:
   said constraining means includes a relatively massive frame around the periphery of said panel.

* * * * *